United States Patent [19]

James

[11] Patent Number: 4,763,440

[45] Date of Patent: Aug. 16, 1988

[54] SYSTEM AND METHOD FOR PROTECTING PLANTS FROM FREEZE DAMAGE

[76] Inventor: Gregory S. James, 116 W. New York Ave., DeLand, Fla. 32720

[21] Appl. No.: 509,919

[22] Filed: Jul. 1, 1983

[51] Int. Cl.⁴ .................. A01G 13/00; A47G 7/08
[52] U.S. Cl. ................................. 47/2; 47/27; 47/31
[58] Field of Search .............. 47/2, 26, 27, 28, 31

[56] References Cited

U.S. PATENT DOCUMENTS

| | | | |
|---|---|---|---|
| Re. 19,984 | 3/1936 | Rosenberg | 47/58 |
| 468,536 | 2/1892 | Pickens | 47/2 X |
| 661,898 | 11/1900 | Tucker | 47/2 |
| 711,225 | 10/1902 | Putnam et al. | 47/2 X |
| 1,058,566 | 4/1913 | Dunlap | 47/2 X |
| 1,106,624 | 8/1914 | Cadwallader et al. | 47/26 X |
| 1,111,993 | 9/1914 | Carder | 47/2 |
| 1,215,057 | 2/1917 | Perkins | 47/2 X |
| 1,437,149 | 11/1922 | Minetti | 47/2 |
| 1,632,611 | 6/1927 | Lloyd | 47/2 X |
| 2,197,929 | 4/1940 | Hale | 47/2 X |
| 2,953,870 | 9/1960 | Nelson | 47/2 X |
| 2,974,442 | 3/1961 | Womelsdorf | 46/26 |
| 3,100,950 | 8/1963 | Heuer | 47/31 X |
| 3,140,563 | 7/1964 | Allen | 47/26 X |
| 3,482,609 | 12/1969 | Neckerman | 47/31 X |
| 3,975,859 | 8/1976 | Müller | 47/31 |
| 4,068,404 | 1/1978 | Sheldon | 47/26 |
| 4,137,667 | 2/1979 | Wallace et al. | 47/2 X |
| 4,267,665 | 5/1981 | Wallace et al. | 47/2 X |

FOREIGN PATENT DOCUMENTS

| | | | |
|---|---|---|---|
| 1353564 | 1/1964 | France | 47/2 |
| 1144366 | 5/1969 | United Kingdom | 47/2 |

Primary Examiner—Robert A. Hafer
Assistant Examiner—D. N. Muir
Attorney, Agent, or Firm—Duckworth, Allen, Dyer & Doppelt

[57] ABSTRACT

A system and method for protecting a ground plot of foliage plants or the like from freezing contemplates a series of ground-level sprinklers throughout the plot and a shade cloth covering of the type having uniformly dispersed openings therein. Elevated sprinklers are provided above the shade cloth and ground-level sprinklers. During periods of freezing ambient temperatures, water is sprinkled through the elevated sprinklers whereby the water freezes in the openings of the covering and holds heat released during operation of the ground-level sprinklers under the covering. When the water droplets freeze into a thin sheet of ice on the covering, the ground-level sprinklers are turned on.

9 Claims, 1 Drawing Sheet

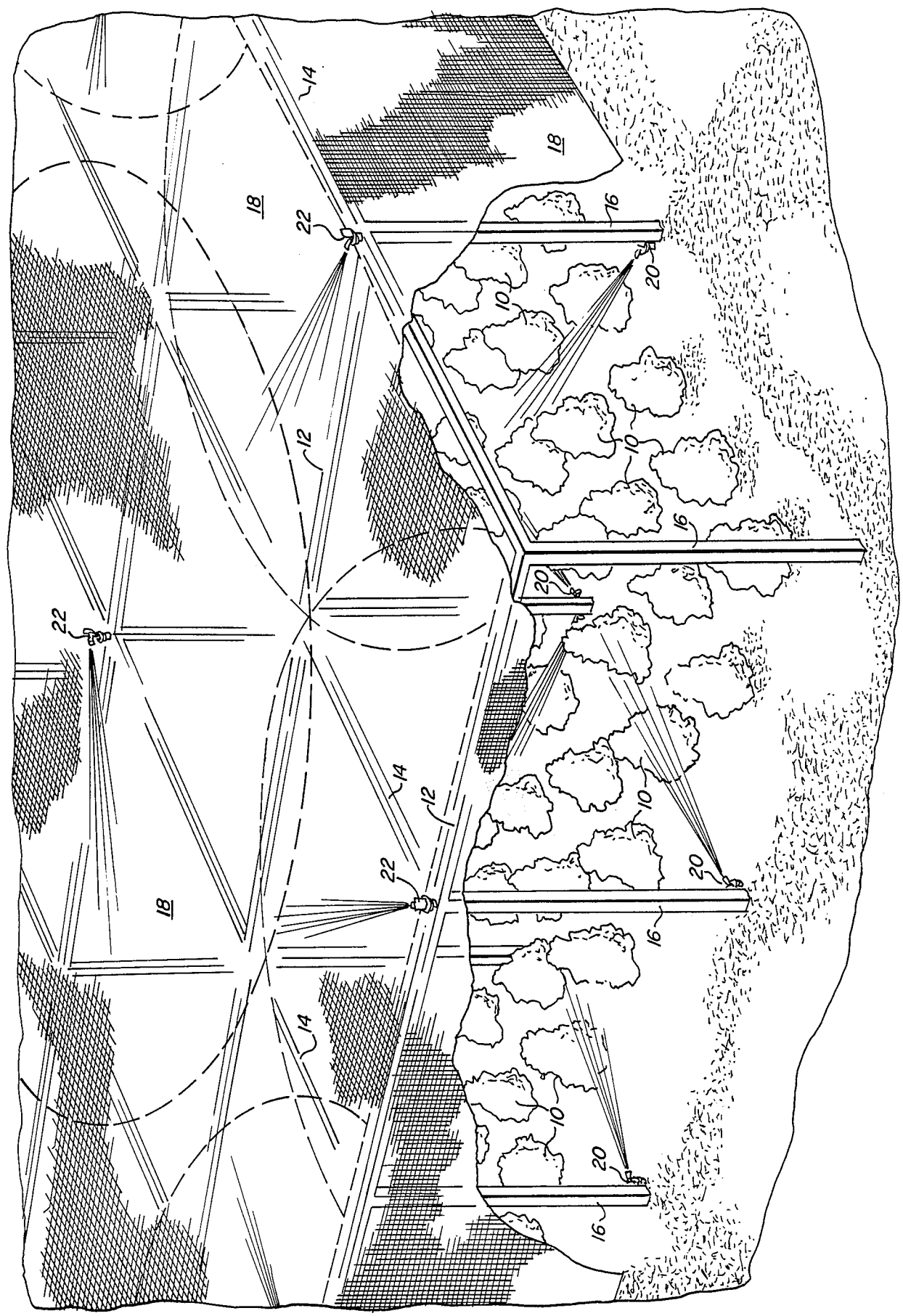

SYSTEM AND METHOD FOR PROTECTING PLANTS FROM FREEZE DAMAGE

BACKGROUND OF THE INVENTION

1. Field of the Invention

The present invention relates generally to plant husbandry techniques, and specifically relates to techniques designed to protect foliage and other types of plants from freeze damage.

2. Description of the Prior Art

It is well known in the art that the sprinkling of water on a ground plot of foliage plants or the like during periods of ambient freezing temperatures will assist in protecting the plants from freeze damage. This is caused in part by the elevated temperature of the water, usually pumped from underground wells or from lakes, which tends to elevate the temperature immediately adjacent the ground plot during sprinkling. However, as the sprinkled water is permitted to freeze, significant plant damage can occur unless the heat released during the sprinkling is retained in the area immediately above the ground plot.

There have been suggestions in the prior art for providing encircling covers to achieve this desirable heat retention feature.

In U.S. Pat. No. 2,197,929, Hale discloses a protective cover for trees, shrubs and other vegetable growths in which the cover is made of a mesh fabric. In accordance with the teachings of Hale, water may be sprayed over the openings in the mesh fabric and allowed to freeze, in order to from a protective film of low conductivity and heat retention.

In U.S. Pat. No. 4,145,855, Sheldon discloses a protective system also employing a mesh fabric, over which may be sprayed a water soluble, heat-transfer resistant organic polymeric coating for heat retention.

Other prior art of interest includes the following U.S. Pat. Nos. 3,830,014 to Baker; 3,788,542 to Mee; 2,069,292 to Walker; and 558,346 to Boyd. Other prior art of interest is found in United States Patent Office Class 47, Subclasses 2 and 27.

SUMMARY OF THE INVENTION

The present invention contemplates a system and method for protecting a ground plot of foliage plants or the like from freezing. In accordance with the present invention, the method comprises the steps of providing a ground-level sprinkler system throughout the plot, and covering the plot and the ground-level sprinklers with a mesh or shade cloth of the type having openings therein. Preferably, this is on the order of a 20 to 80 percent shade cloth having openings therein with a diameter not greater than 0.25 inches.

The ground plot is provided with elevated sprinklers extending above the ground-level sprinklers and the shade cloth.

As the ambient temperature drops to about 32° F., the elevated sprinkler system is turned on, delaying the time at which the ground level sprinklers must be turned on. For instance, it has been noted that at 31° F., with little or no wind, the ground level sprinklers need not be initiated. The ambient temperature under the covering, upon turning on the elevated sprinklers, almost immediately increases between 2° and 4° F. After the mesh covering is covered with a thin sheet of ice, then the ground-level sprinklers are turned on, and the elevated sprinklers may be turned off.

In accordance with the present invention, the temperature of the water passing through the ground-level sprinklers is substantially above 32° F. However, the amount of water passing through the ground-level sprinklers is controlled so as to not significantly affect the freezing conditions of the water in the mesh of the shade cloth. This of course will be dependent somewhat on the size of the openings in the shade cloth versus the amount and temperature of the water passing through the ground-level sprinklers. By way of example, the shade cloth is typically 60 percent shade cloth, as noted above, having openings therein not greater than 0.25 inches in diameter. The water passing through the ground-level sprinklers during operation of the system is typically at a temperature of about 40°–75° F. Typically, the water passing through the elevated sprinklers is at approximately the same temperature as the water passing through the ground-level sprinklers. Preferably, however, the water passing through the elevated sprinklers is at a much lower rate, and is sprayed through sprinkler heads which break the water up into droplets in order to facilitate freezing of the water in the apertures of the shade cloth.

DESCRIPTION OF THE DRAWING

The single FIGURE of the drawing is a perspective view illustrating the system of the present invention.

DESCRIPTION OF THE PREFERRED EMBODIMENT

Noting the drawing, the system of the present invention comprises a ground plot having foliage, for example leather-leafed ferns 10 above which there is provided a framework of longitudinal and lateral supports 12, 14 respectively supported by vertical posts 16. Overlying the framework of the supports 12, 14 and 16 is a mesh shade cloth covering 18. A suitable shade cloth is manufactured by Amoco Fabric Co., whose address is 550 Interstate North Parkway, Atlanta, Ga. 30339, and is sold as product number Propex ML 73, 63 ,55, 47 or 30.

A series of ground-level sprinklers 20 are provided underneath the covering 18. While two of the ground-level sprinklers 20 are shown in the drawing, it will be understood that the sprinklers 20 are disbursed uniformly across the entire ground plot in which the ferns 10 are growing. Suitably, the ground-level sprinklers are connected to a pump and water supply (not shown).

In accordance with the present invention, there is also provided a system of elevated sprinklers 22 extending above the level of the supports 12, 14 and the shade cloth 18. These elevated sprinklers 22 are likewise coupled to a pump and source of water, not shown, and are provided with means permitting a fine spray of water to be dispensed across the top of the shade cloth 18, and in the interstices of the shade cloth and which will freeze therein when the ambient temperature is sufficiently below 32° F. to achieve that freezing.

In use, the system of the present invention permits sprinkling of water through either the elevated sprinklers 22 or the ground-level sprinklers 20, or both, as the ambient temperature approaches and passes below 32° F. The latent heat of the water passing through the ground-level sprinklers 20 protects the plants 10 from freezing. This latent heat is trapped underneath the shade cloth 18 by the freezing of the fine droplets of water sprayed across the top surface of the shade cloth 18 via the elevated sprinklers 22. When the ambient temperature has been elevated sufficiently to cause melting of the frozen droplets in the interstices of the shade cloth 18, then the water flow through either or both the ground-level and elevated sprinklers 20, 22 may be interdicted until such time as freeze protection is again required.

Through proper management, the use of both the elevated and ground-level sprinkler systems can reduce the volume of water necessary by 60 percent of the amount when only the traditional lower sprinkler is used. In addition, vegetation can be protected with the same volume of water at much lower temperatures. The normal procedure would be to turn on the elevated sprinklers initially. However, since the water through the elevated sprinklers generates heat and the droplets of water on the mesh even prior to freezing provides a heat barrier, a time delay before the operation of the ground-level sprinklers can take place. Of course, the thickness of the ice layer desired on the mesh covering is limited by the strength of the structure.

What is claimed is:

1. A method for protecting a ground plot of plants from freezing, said method comprising the steps of:
   (a) providing ground-level sprinklers throughout said plot;
   (b) covering said plot and said ground-level sprinklers with a covering of the type having openings therein;
   (c) providing elevated sprinklers above said covering;
   (d) sprinkling said plot with water through said sprinklers; and
   (e) sprinkling said covering with water through said elevated sprinklers as the ambient temperature drops to about 32° F., whereby the water from said elevated sprinklers freezes in the openings of said covering and holds heat released during operation of said ground-level sprinklers under said covering.

2. The method recited in claim 1 wherein the temperature of the water through the said sprinklers is above 32° F.

3. The method recited in claim 1 wherein said covering is on the order of a 20 to 80 percent shade cloth.

4. The method recited in claim 3 wherein the openings of said shade cloth are not greater than about 0.25 inches in diameter.

5. The method recited in claim 1 wherein the rate of sprinkling of water through said elevated sprinklers is much lower than the rate of sprinkling through said ground level sprinklers.

6. A method for protecting a ground plot of plants from freezing, said method comprising the steps of:
   (a) providing ground-level sprinklers throughout said plot;
   (b) covering said plot and said ground-level sprinklers with a covering of the type having openings therein;
   (c) providing elevated sprinklers above said covering;
   (d) sprinkling said cover and said plot with water through said elevated sprinklers as the ambient temperature drops to 32° F., to first elevate the temperature under said covering and then freeze droplets of water in the openings of said covering as said ambient temperature drops below 32° F.; and thereafter
   (e) sprinkling water having a temperature above 32° F. through said ground-level sprinklers to maintain the temperature under said covering above 32° F.

7. A system for protecting a ground plot of plants from freezing; said system comprising:
   (a) a series of ground-level sprinklers throughout said plot;
   (b) a covering said plot and said ground-level sprinklers, said covering over of the type having openings therein;
   (c) elevated sprinklers above said covering;
   (d) means for sprinkling said plot with water through said sprinklers; and wherein
   (e) said elevated sprinklers permit water sprinkled therethrough to fall on said covering and be frozen in the openings thereof when the ambient temperature has dropped substantially below 32° F., whereby the frozen water droplets in the openings of said covering hold heat released during operation of said ground-level sprinklers under said covering.

8. The system recited in claim 7 wherein said covering is on the order of a 20 to 80 percent shade cloth.

9. The system recited in claim 8 wherein the openings of said covering are not greater than about 0.25 inches in diameter.

* * * * *

REEXAMINATION CERTIFICATE (2565th)
United States Patent [19]
James

[11] B1 4,763,440
[45] Certificate Issued May 9, 1995

[54] SYSTEM AND METHOD FOR PROTECTING PLANTS FROM FREEZE DAMAGE

[76] Inventor: Gregory S. James, 116 W. New York Ave., DeLand, Fla. 32720

Reexamination Request:
No. 90/003,448, May 31, 1994

Reexamination Certificate for:
Patent No.: 4,763,440
Issued: Aug. 16, 1988
Appl. No.: 509,919
Filed: Jul. 1, 1983

[51] Int. Cl.⁶ .................... A01G 13/02; A01G 13/06
[52] U.S. Cl. ............................................ 47/2; 47/27; 47/31; 47/58.01
[58] Field of Search ............... 47/2, 2 CCB, 58.01, 47/58.02, 58 EC, 26, 26 F, 27 C

[56] References Cited
U.S. PATENT DOCUMENTS

| | | | |
|---|---|---|---|
| 2,197,929 | 4/1940 | Hale | 47/21 |
| 2,482,609 | 12/1969 | Neckerman | 139/383 |
| 2,974,442 | 3/1961 | Womelsdorf | 47/26 |

*Primary Examiner*—Henry E. Raduazo
*Attorney, Agent, or Firm*—Arthur G. Yeager; Earl L. Tyner

[57] ABSTRACT

A system and method for protecting a ground plot of foliage plants or the like from freezing contemplates a series of ground-level sprinklers throughout the plot and a shade cloth covering of the type having uniformly dispersed openings therein. Elevated sprinklers are provided above the shade cloth and ground-level sprinklers. During periods of freezing ambient temperatures, water is sprinkled through the elevated sprinklers whereby the water freezes in the openings of the covering and holds heat released during operation of the ground-level sprinklers under the covering. When the water droplets freeze into a thin sheet of ice on the covering, the ground-level sprinklers are turned on.

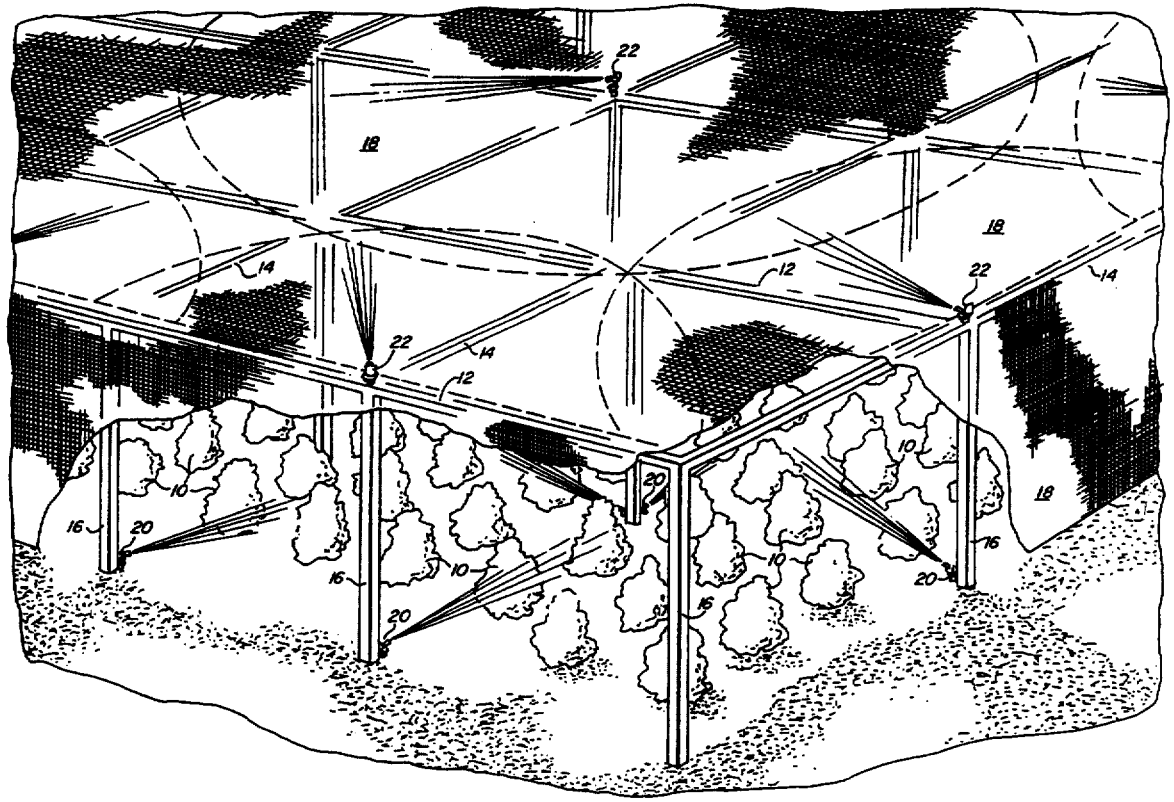

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6, 7, 8, and 9 are determined to be patentable as amended.

Claims 3–5, dependent on an amended claim, are determined to be patentable.

New claim 10 is added and determined to be patentable.

1. A method for protecting a ground plot of *foliage* plants from freezing, said method comprising the steps of:
    (a) providing ground-level sprinklers throughout said plot;
    (b) covering said plot and said ground-level sprinklers with a covering of the type having openings therein;
    (c) providing elevated sprinklers above said covering;
    (d) sprinkling said plot with water through said *ground-level* sprinklers; and
    (e) sprinkling said covering with water through said elevated sprinklers as the ambient temperature drops to about 32° F., whereby the water from said elevated sprinklers freezes in the openings of said covering and holds heat released during operation of said ground-level sprinklers under said covering.

2. The method recited in claim 1 wherein the temperature of the water through [the] *said ground-level* sprinklers is above 32° F.

6. A method for protecting a ground plot of *foliage* plants from freezing, said method comprising the steps of:
    (a) providing ground-level sprinklers throughout said plot;
    (b) covering said plot and said ground-level sprinklers with a covering of the type having openings therein;
    (c) providing elevated sprinklers above said covering;
    (d) sprinkling said cover and said plot with water through said elevated sprinklers as the ambient temperature drops to 32° F., to first elevate the temperature under said covering and then freeze droplets of water in the openings of said covering as said ambient temperature drops below 32° F.; and [thereafter]
    (e) sprinkling water having a temperature above 32° F. through said ground-level sprinklers to maintain the temperature under said covering above 32° F.

7. A *combination of a* system for [protecting] *freeze protection and* a ground plot of *foliage* plants to be protected from freezing [; said system] comprising:
    (a) *a ground plot of foliage plants;*
    [(a)] (b) a series of *spaced* ground-level sprinklers throughout said *ground* plot;
    [(b)] (c) a covering *over* said *ground* plot and said ground-level sprinklers, said covering [over] *being* of [the] *a* type having openings therein;
    [(c)] (d) *a series of* elevated *spaced* sprinklers above *and throughout* said covering; *and*
    [(d)] (e) means for sprinkling said plot with water *above 32° F.* through said *ground-level and elevated* sprinklers [; and wherein] *to maintain the temperature at plant level of said foliage plants above 32° F. and to* [(e) said elevated sprinklers] permit water sprinkled [therethrough] *from said elevated sprinklers* to fall on said covering and be frozen in the openings thereof *to form a thin sheet of ice* when the ambient temperature has dropped substantially below 32° F. *without permitting the temperature at plant level of said foliage plants to drop below 32° F.*, whereby the frozen water droplets in [the] *said* openings of said covering hold heat released during operation of said ground-level sprinklers under said covering *to protect said ground plot of foliage plants from freezing.*

8. The [system] *combination* recited in claim 7 wherein said covering is on the order of a 20 to 80 percent shade cloth.

9. The [system] *combination* recited in claim 8 wherein the openings of said covering are not greater than about 0.25 inches in diameter.

*10. A method for protecting a ground plot of foliage type plants from freezing, said method comprising the steps of:*
    *(a) providing ground-level sprinklers throughout the plot;*
    *(b) covering the plot and the ground-level sprinklers with a mesh covering;*
    *(c) providing spaced elevated sprinklers above the covering;*
    *(d) sprinkling the plants with water having a temperature greater than 32° F. through the ground level sprinklers thereby releasing latent heat; and*
    *(e) thereafter sprinkling the covering throughout with water through the elevated sprinklers as the ambient temperature drops to about 32° F., whereby the water from the elevated sprinklers freezes in the openings of the mesh covering thereby holding the heat released from the water sprinkled by operation of the ground-level sprinklers under the covering.*

* * * * *